United States Patent [19]
Adam

[11] Patent Number: 5,671,551
[45] Date of Patent: Sep. 30, 1997

[54] HAY STORAGE DEVICE AND METHOD

[76] Inventor: Bernard Adam, 400 Chemin Racine, R.R. 1, Granby, Canada, J2G 8C6

[21] Appl. No.: 550,252

[22] Filed: Oct. 30, 1995

[30] Foreign Application Priority Data

Nov. 1, 1994 [GB] United Kingdom ............... 9422537

[51] Int. Cl.$^6$ .................................................. F26B 19/00
[52] U.S. Cl. ............................ 34/201; 34/202; 34/511; 34/518; 34/218
[58] Field of Search ........................... 34/201, 202, 511, 34/518, 522; 220/367.1; 215/231; 150/154

[56] References Cited

U.S. PATENT DOCUMENTS

| | | | |
|---|---|---|---|
| 1,981,420 | 11/1934 | Kreutzer | 98/54 |
| 2,095,319 | 10/1937 | Drake | 34/19 |
| 2,895,400 | 7/1959 | Topf | 34/402 |
| 4,221,085 | 9/1980 | Conaghan | 52/4 |
| 4,248,343 | 2/1981 | Schaefer | 206/83.5 |
| 4,640,021 | 2/1987 | Gullickson | 34/15 |
| 5,197,236 | 3/1993 | Calhoun et al. | 52/4 |

*Primary Examiner*—Henry A. Bennett
*Assistant Examiner*—Dinnatia Doster
*Attorney, Agent, or Firm*—Eric Fincham

[57] ABSTRACT

A protective device for use in protecting hay bales and preventing spoilage thereof, the device comprising a cover designed to substantially cover an upper surface of the hay bale, the cover being spaced from the upper surface thereof and having a vent to permit the egress of air from the space between the upper surface and the cover and to prevent the increase ingress of moisture therethrough. The cover preferably has means of securing itself to the hay bale. The cover minimizes deterioration of the hay and is particularly adapted for use with so called round bales stored on their side.

10 Claims, 2 Drawing Sheets

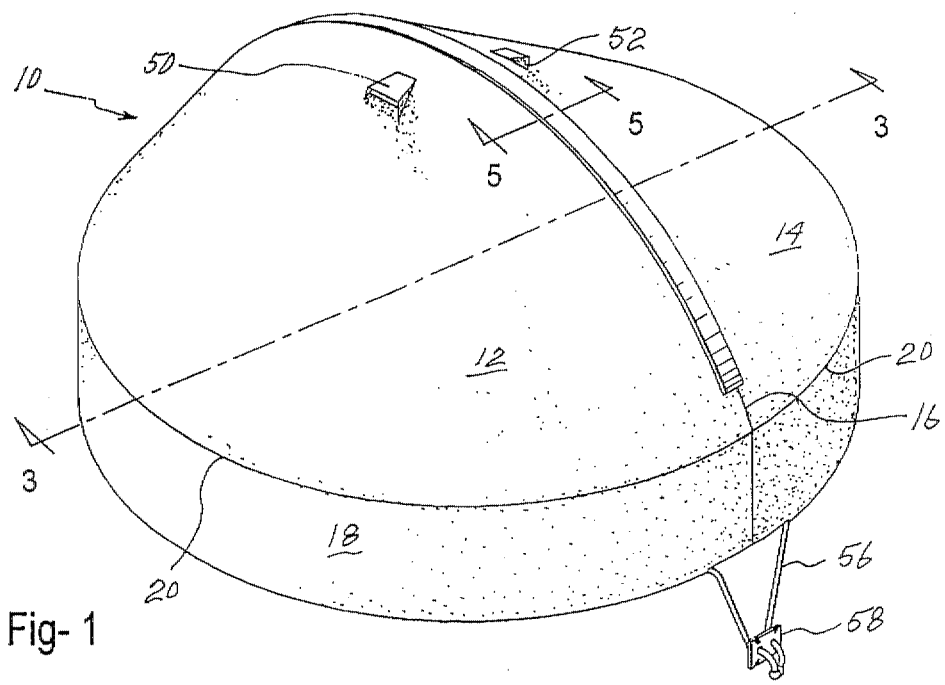
Fig-1
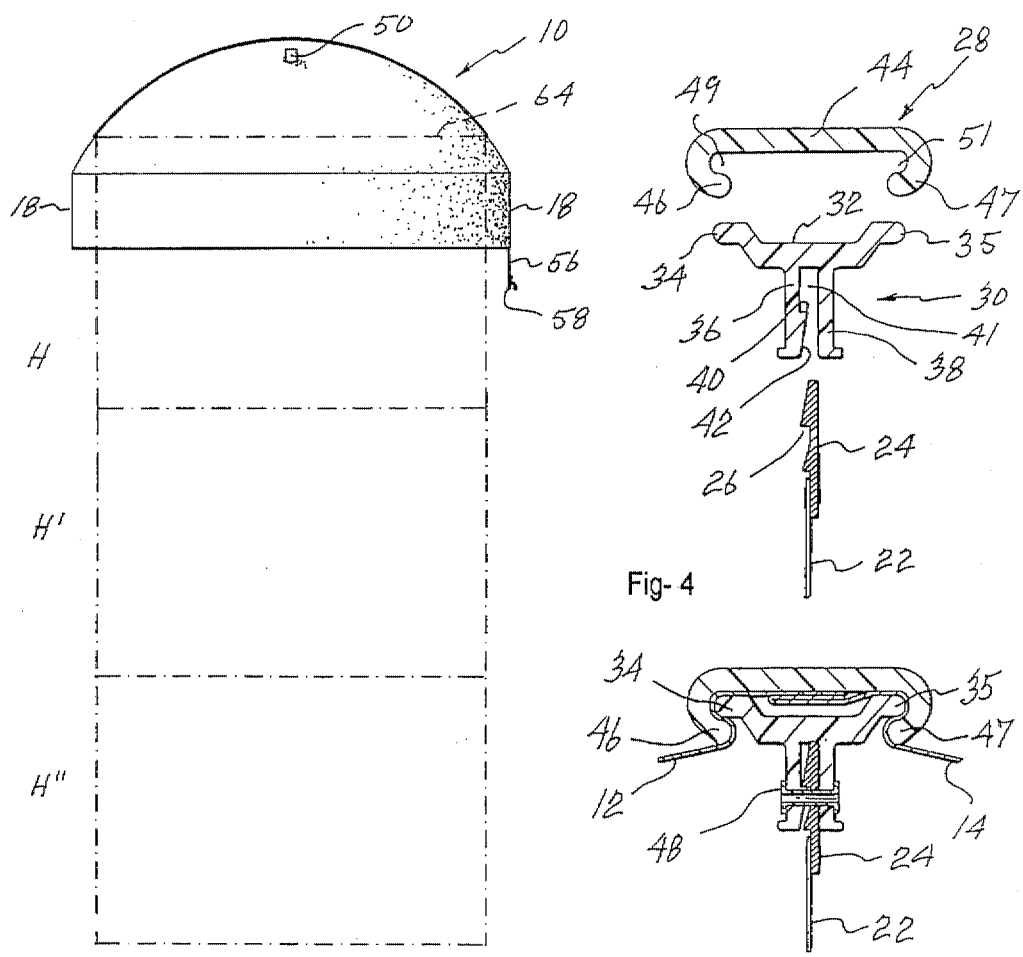
Fig-2
Fig-4
Fig-5

HAY STORAGE DEVICE AND METHOD

BACKGROUND OF THE INVENTION

The present invention relates to a device for assisting in the storage of hay and a method for improving the storage of hay.

Hay is primarily a horse and cattle feed which may be composed of many different types of plants including bluegrass, timothy, alphagrasses, alfalfa, clover, rye, barley, oats, etc. The use of such material as a feed has been well known over very long periods of time.

In general, after the hay is cut, it is allowed to lie on the ground for a certain period of time to assist in the drying. It is then raked into long rows called windrows from where it is usually baled although it has also been known to stack or chop the hay.

Baling machines are then used to either press the hay into rectangular bales or roll the hay into round bales. These bales may then either be stored in the barn or kept outdoors. As is well known, rectangular bales must be covered with a material such as loose hay or canvas to protect them from the rain when they are stacked outside. Round bales generally have not been kept protected since it has been felt that they will shed their water because of their shape—i.e. the round bales are frequently in the form of a cylinder and they lie on their side so that the generally convex configuration will permit the shedding of rain.

Moisture is an ever present concern for the farmer. If the hay is not at a certain humidity level, serious problems can arise with the hay. Thus, if the hay is placed in a building while at a high moisture level, the bacterial actions within the haystack can lead to the production of certain gases and heat which can lead to spontaneous combustion. Many barns have been lost to fire in this manner. Furthermore, the bacterial action on the hay and the heat produced can cause loss of nutritive value for the hay.

In order to overcome these problems, it has been known to use artificial methods for curing hay to speed up the harvest and decrease the hazard of getting the hay wet with rain. Thus, it has been known to use driers in which large fans blow air through the hay until the moisture has been reduced to about 20% to minimize any risk of spoilage and/or spontaneous combustion. Needless to say, this requires additional labour and expense.

The other alternative of leaving the hay in the field can also be costly. Thus, even though the cylindrical configuration of the round bale is supposed to assist in shedding rain, for practical purposes approximately 25% of the outer layer of the bale is not suitable as feed. Furthermore, even some of the hay in a so called transition zone between the interior of the bale and the outer layers may be of questionable nutritive value and indeed, it has been known that some animals will refuse to eat this hay.

SUMMARY OF THE INVENTION

It is an object of the present invention to provide a method for the drying and storage of hay bales which will minimize the loss of hay.

It is a further object to provide a protective device for round bales of hay.

It is a further object of the present invention to provide a method for the drying of bales of hay in an exterior environment.

According to one aspect of the present invention, there is provided a protective device for a hay bale which has an upper surface exposed to the elements, the protective device comprising a cover adapted to substantially cover said upper surface, means for spacing said cover from said upper surface, and vent means to permit the egress of gas from the space between the upper surface and the cover, the vent means also substantially preventing the ingress of moisture therethrough.

According to a further aspect of the invention, there is provided a method for drying a cylindrical bale of hay, the method comprising the steps of placing the cylindrical bale of hay on a flat end thereof, placing a cover member over an upper flat end, spacing the cover from the upper flat end, and providing vent means between the exterior and the space formed between the cover and the flat end.

In greater detail, the practice of the present invention is particularly directed to bales of hay formed in the so called "round bale" configuration which may be of a cylindrical configuration. It will, be understood by those knowledgable in the art that the principals of the present invention can be used for round, cylindrical and other configurations.

The device, for ease of use, cost, and storage is preferably formed so as to be easily stored from one use to another and as such, may be either foldable or nestable so as to use a minimum of space when stored.

The cover may be formed either of a rigid or a flexible material which is suitably water repellant. The cover is adapted to be placed over an upper surface of the baled hay and to provide a space between the upper surface and the cover.

Vent means communicate between the exterior and the space formed between the cover and upper surface of the hay bale; the vent means provide a means of venting heat and gases to the exterior. In addition, the vent means are designed to prevent the ingress of a moisture such as rain to the hay bales.

In one convenient embodiment, the cover may be formed of a flexible plastic or a plasticized material and many such materials are known to those skilled in the art; one such suitable material would be a low density woven polyethylene material. This material provides the advantage of being relatively inexpensive while having tear resistant and puncture resistant properties which are important given the environment in which the device is used. Being of a flexible material, spacer means are provided for separating or spacing the cover from the upper surface of the hay bale while as aforementioned, the cover includes vent means to the exterior.

In a preferred embodiment of the invention, there are provided means for securing the cover or protective device in the desired position. To this end, there may be provided means for securing the protective device to the hay bale and in one particular embodiment, these means may include a drawstring type of arrangement as will be discussed in the preferred embodiments hereinbelow.

Having thus generally described the invention, reference will be made to the accompanying drawings illustrating an embodiment thereof, in which:

BRIEF DESCRIPTION OF THE DRAWINGS

FIG. 1 is a perspective view of a protective device according to the present invention;

FIG. 2 is a side elevational view of the device in position on bales of hay;

FIG. 4 is an exploded view of the spacing means of the present invention; and

FIG. 5 is a sectional view taken along the lines 5—5 of FIG. 1.

DESCRIPTION OF THE PREFERRED EMBODIMENTS

Figure 3:
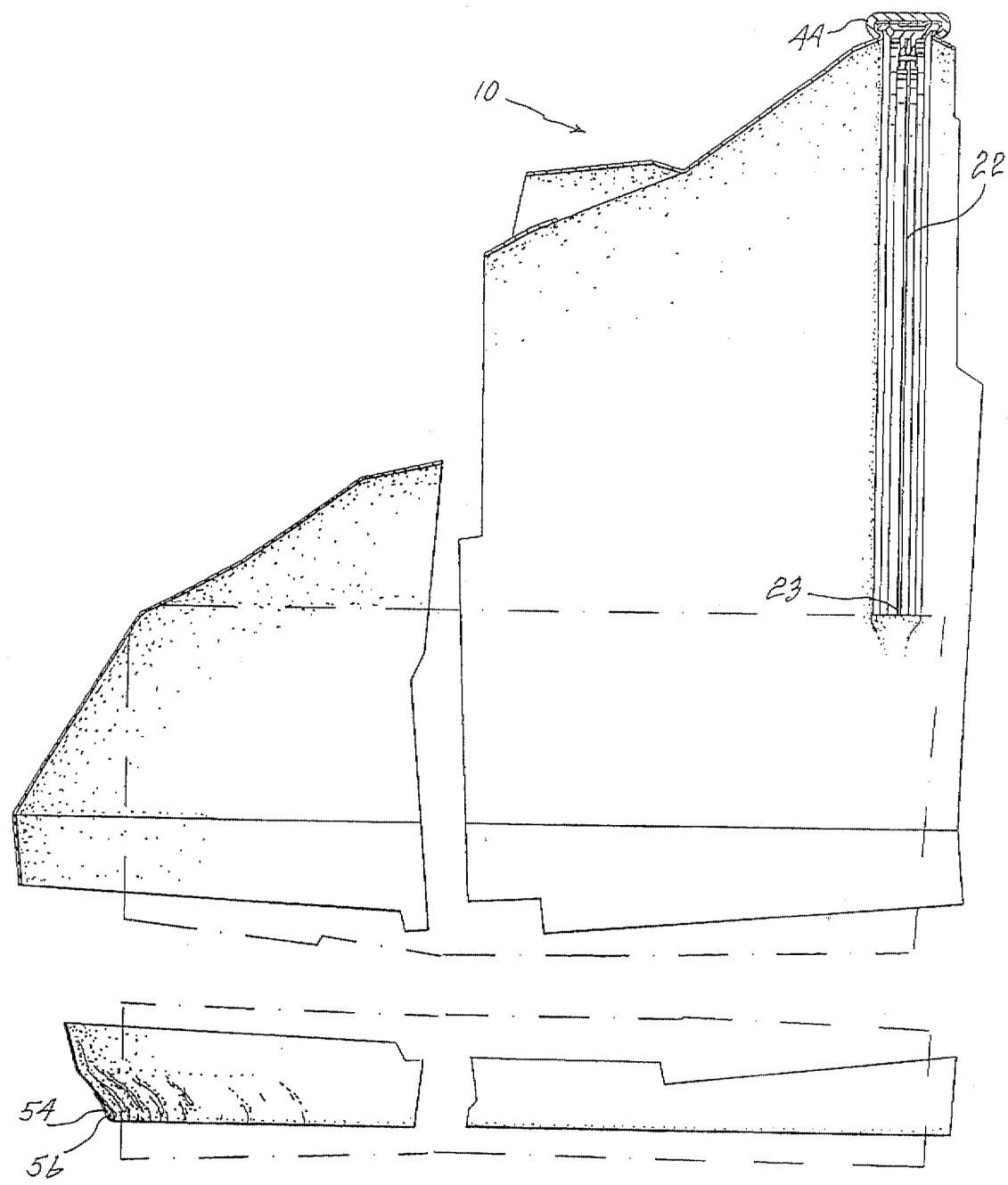
FIG. 3 is a sectional view taken along the lines 3—3 of FIG. 1.

Referring to the drawings in greater detail and by reference characters thereto, there is illustrated in FIG. 1 a cover 10 which is comprised of a first half 12 and a second half 14 and is formed of a suitable flexible material such as a woven low density polyethylene sheet material. First half 12 and second half 14 are secured together by a line of stitching 16 in an overlap manner (see FIG. 5).

A skirt 18 depends downwardly from the marginal edges of first half 12 and second half 14; the arrangement thereby provides a cover having a dome like configuration with skirt 18 depending downwardly therefrom. Skirt 18 is secured to first half 12 and second half 14 by a suitable line of stitching 20. Skirt 18 may comprise one or more pieces.

In order to maintain the dome like configuration of cover 10, a spacing member 22 is provided. Spacing member 22 may be best seen in FIG. 3, it be formed of a similar material to that of cover 10—i.e. a reinforced or woven polyethylene material having a double layer portion 23 at its lower edge. An upper edge of spacing member 22 is secured to a attaching element 24 as best seen in FIGS. 5 and 6. Element 24 is secured to the upper marginal edge of spacing member 22 and conveniently may be formed of a suitable plastic material. Element 24 has a generally longitudinally extending configuration with a groove or notch 26 formed in one side thereof.

The cover includes first and second locking members generally designated by reference numerals 28 and 30 respectively (see FIG. 4). Second locking member 30 has a generally longitudinally extending body portion 32 on which there are provided upwardly and outwardly extending ears 34 and 35. Extending downwardly from body portion 32 is a first leg 36 and a second leg 38 to define therebetween a slot 41. Leg 36 includes an inwardly extending shoulder 40 from which tapered surface 42 extends downwardly.

First locking member 28 has a somewhat C-shaped configuration with a longitudinally extending body portion 44 and a first and second inwardly extending flanges 46 and 47 to thereby define channels 49 and 51 respectively.

As shown in FIG. 5, attaching element 24 is insertable into slot 41 between first and second legs 36, 38 of second locking member 30 with inwardly extending shoulder 40 adapted to engage notch or groove 26. Tapered surface 42 allows for smooth insertion of element 24. Locking pins 48 may be inserted to prevent withdrawal of attaching element 24.

In turn, second locking member 30 is engagable with first locking member 28 with ears 34, 35 being engagable within grooves 49, 51 respectively, and with first half 12 and second half 14 being securely held by the inter-engagement by the locking members 28, 30.

As shown in FIG. 1, first and second vents 50 and 52 are provided. Each vent comprises a covering over an aperture formed in first half 12 and second half 14 and suitably attached thereto.

Turning to FIG. 3, it will be noted that skirt 18, at its free marginal edge, is formed to have a double thickness and to thereby define a channel 54 therebetween. Within channel 54 there is provided a drawstring 56 and a locking clip 58 is secured to the end of drawstring 56.

As may be seen in FIG. 1, locking clip 58 includes a pair of centrally located apertures with each end of drawstring 56 extending through an aperture. A plurality of slots are provided around the peripheral edge of locking clip 58 and are sized to sized to receive drawstring 56.

In operation, and as shown in FIGS. 2 and 3, cover 10 is placed on top of three bales of hay H', H", and H"'. The bales are cylindrical in configuration with an outer mesh covering and are stacked one on top of each other with the flat ends being engaged to permit movement of air through the middle of the bale in a chimney-like arrangement.

As will be noted, spacing member 22 rests on top of an upper surface 64 of bale H to ensure that cover 10 is spaced from the upper surface. Following placement of the cover, drawstring 56 is tightened and secured by use of a locking clip 58. Drawstring 56, after tightening, may be inserted in one of the slots to prevent loosening of the drawstring 56.

In operation, following the baling of the hay, the bales are placed one on top of the other to a desired height. Normally, between 2–6 cylindrical bales of hay would be piled on top of each other with a preferred range being between 3–5 bales. In turn, if desired, the bales may be stacked in rows in a generally rectangular configuration. Supports may be used—i.e. they may be supported exteriorly and/or interiorly and including a means for spacing the bales from the ground.

If desired, the covers may incorporated drain means for draining rain water to a desired location so as to minimize damage to the baled hay.

Following the baling of the hay, the bales are arranged in the desired manner and the protective device of the present invention is placed on top of the bale. The bacteriological activity starts almost immediately in conjunction with a temperature rise. Due to the chimney-like effect with the stacking of the cylindrical bales on their ends, the gases and heat are vented and damage to the hay prevented. After a period of approximately between 14 to 21 days of drying, all danger of spontaneous combustion is normally prevented.

It will be understood that the above described embodiment is for purposes of illustration only and that changes and modifications may be made thereto without the departing from the spirit and scope of the invention.

I claim:

1. A protective device for a hay bale, the protective device comprising a flexible cover adapted to substantially cover an upper surface of said hay bale, means for spacing said cover from said surface and vent means comprising a plurality of apertures formed in said cover to permit the egress of air from the space between the upper surface and the cover, said vent means also having means associated therewith for preventing the ingress of moisture therethrough.

2. The device of claim 1 wherein said cover has a substantially dome-like configuration, said means for spacing said cover from said upper surface comprising a spacing member extending between said upper surface and said cover.

3. The device of claim 1 wherein said material is a woven low density polyethylene.

4. The device of claim 1 further including a skirt portion extending downwardly from a marginal edge of said cover.

5. The device of claim 4 further including means to secure said skirt portion about a hay bale.

6. The device of claim 4 wherein said means comprises a drawstring.

7. An arrangement for drying hay bales comprising at least one hay bale having a generally cylindrical configuration and having a flat end thereof forming an upper surface, a cover mounted on said hay bale to substantially cover said upper surface, said cover being spaced from said upper surface, said cover having vent means therein to permit the egress of gas from the space between said upper surface and said cover, said vent means also preventing the ingress of moisture therethrough.

8. The arrangement of claim 7 including a plurality of cylindrical hay bales mounted in a vertical relationship end to end, said cover being placed on an upper surface of the uppermost of said hay bales.

9. The arrangement of claim 7 further including a skirt portion extending downwardly from a marginal edge of said cover.

10. The arrangement of claim 9 including means to secure said skirt portion about a hay bale.

* * * * *